A. L. CLARK.
GAS PLANT.
APPLICATION FILED AUG. 27, 1919.
1,403,590.
Patented Jan. 17, 1922.
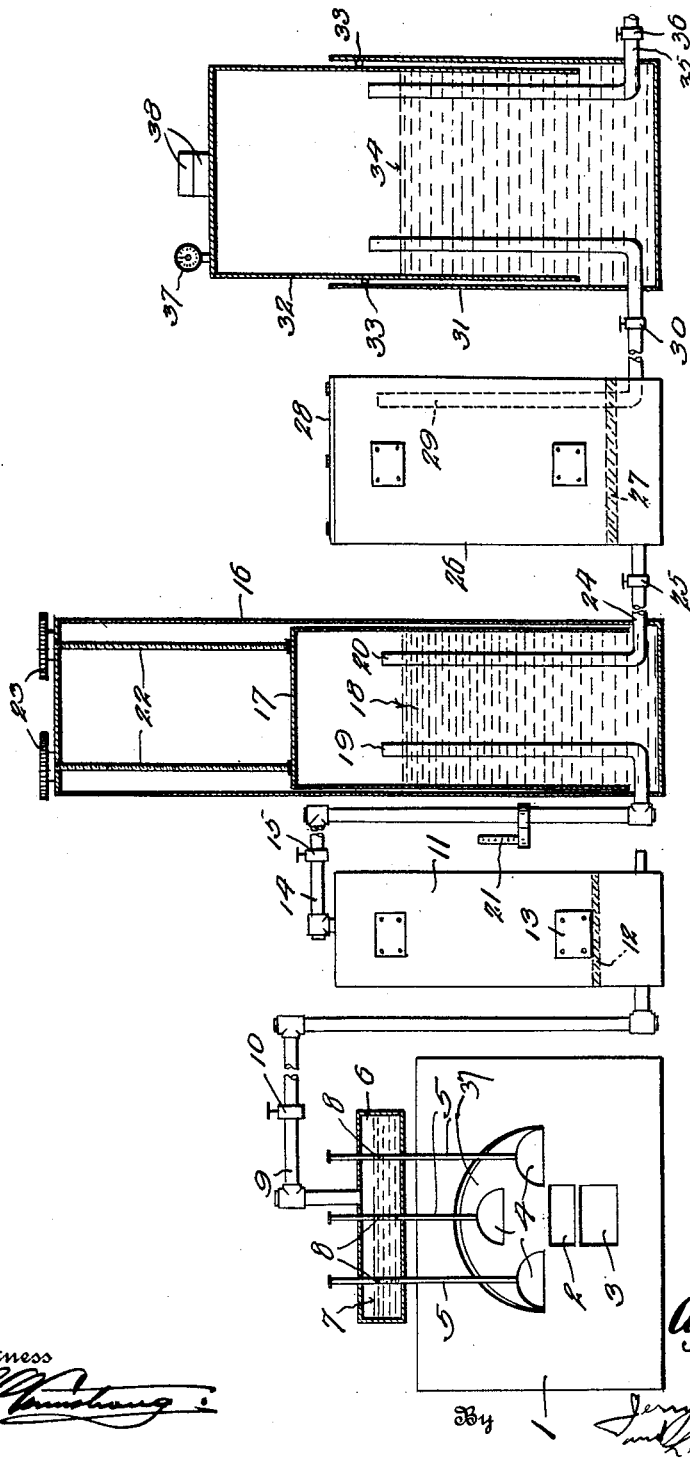
Inventor
Agustus L. Clark
Witness
By
Jerry A Mathews
Lester L Sargent
Attorneys

UNITED STATES PATENT OFFICE.

AUGUSTUS L. CLARK, OF MONTPELIER, VERMONT.

GAS PLANT.

1,403,590.  Specification of Letters Patent.  Patented Jan. 17, 1922.

Application filed August 27, 1919. Serial No. 329,197.

*To all whom it may concern:*

Be it known that I, AUGUSTUS L. CLARK, a citizen of the United States, residing at Montpelier, in the county of Washington and State of Vermont, have invented a new and useful Gas Plant, of which the following is a specification.

The object of my invention is to provide an improved apparatus which can be utilized generally in connection with house furnaces of ordinary construction, with slight modification for the manufacture of gas by each householder for his individual use and to provide an improved process whereby gas can be produced and stored by the individual householder for use in heating, cooking and lighting at comparatively small expense, thus utilizing bituminous coal to the best advantage and also obtain coke which can be used for ordinary heating purposes.

I carry out my improved process by the apparatus illustrated in the accompanying sheet of drawings which consist of diagrammatic view, enlarged and partly in elevation and partly in section.

Like numerals designate similar parts in the drawings.

Referring to the drawing, any suitable furnace 1 may be utilized provided it has suitable airtight doors and dampers, such as the door 3 and damper 2. Within the arched chamber 37 of the furnace I provide a plurality of gas domes or retorts 4, arranged as shown, through which the gas may flow upward through flues 5 and escape through perforations 8 into the water in the main 6, the tar in the products of combustion being stopped by the water, the water line 7 being a short distance above the perforations 8. From main 6 the gas flows through stack 9, which is provided with a suitable valve 10, and into a suitable scrubber tank 11 which is provided with a suitable door 13 and a grate 12.

In scrubber tank 11 I provide coke or other suitable fine material that filters the gas. From scrubber tank 11 the gas passes through tube 14, past a suitable valve 15, and gage 21 upward through outlet 19 into the adjustable relief tank chamber 17. Mounted in relief tank 16 are spaced vertical screws 22, operated by suitable hand wheels 23, by means of which chamber 17 may be raised or lowered. Suction is caused by elevating chamber 17 by means of the screws 22 and hand wheels 23, which lifts the tank 17 out of the water (designated 18). After the relief tank has been filled with gas, the valve 15 is closed, and the tank chamber 17 again lowered, and the gas forced through nozzle 20 of pipe 24, past valve 25 and into the purifier tank 26, suitable material for purifying the gas being provided on the grate 27 in tank 26. Tank 26 may be provided with a suitable quantity of oxide of iron, which is used for purifying the gas to eliminate the sulphur smell. The gas entering tank 26 flows in below the grate 27, thence up through the purifying material, and thence through pipe 29 past valve 30 into the inverted chamber 32, which is slidably mounted in the storage tank 31. To eliminate friction, I provide suitable bearings 33 between tank 31 and inverted tank 32. I may place any suitable weight on the top of tank 32, if desired. Opening out of tank 31, I provide a pipe 35, having a valve 36, for regulating the discharge of the gas for use as required. Tank 32 is provided with a suitable pressure indicating gage 37, and any required weights 38 may be placed on top of the tank, as indicated diagrammatically in the drawing. Storage tanks 31 and 32 of any suitable size may be provided.

In operating the invention, soft coal is employed, a very considerable economy being effected by obtaining and storing the gas for use, while from it coke is obtained which can be burned in stove or furnace. The plant is adaptable to operating with a small amount of material, making it more generally available. The detailed operation has been described above.

What I claim is:

1. In a small gas plant apparatus adapted for use in connection with house furnaces, a relief tank comprising a main closed chamber, an inverted chamber within said main chamber and in communication therewith at the open bottom end of the inverted chamber, elongated threaded rods attached to the upper end of the inverted chamber and extending through the upper end of the main chamber to raise and lower said chamber whereby to produce a suction action, hand wheels for operating said threaded rods, means for conducting gas into said inverted chamber from gas producing apparatus, and means for the outflow of gas from said chamber to gas storage apparatus, each of the two aforesaid means for the passage of gas to and from the relief tank having valve controlled means, the relief tank being partially filled with water.

2. In a small gas plant apparatus capable of manual operation and adapted for use in connection with house furnaces, the combination with gas producing apparatus, gas purifying apparatus, and gas storing apparatus, of a relief tank interposed between the gas purifying apparatus and the gas storage apparatus and in regulated connection therewith, said relief tank comprising a main chamber, an inverted chamber enclosed within said main chamber and having its bottom end in open communication therewith, manually controlled means attached to the inverted chamber and extending through the cover of the main chamber for raising and lowering the inverted chamber by hand to suck in and discharge gas therefrom, the said main and inverted chambers being partially filled with water, conduits for conducting gas into and from the inverted chamber, said conduits having their open ends positioned above the level of the water therein, and valve means in the various conduits for regulating the flow of gas whereby the apparatus may be readily operated by hand, without the use of weights or of pumps or other heavy apparatus such as is required in larger gas plants.

3. In a gas plant apparatus suited for use in connection with house furnaces, the combination of gas retorts, a scrubber tank into which gas from the retorts flows, said tank being substantially filled with filtering material, a relief tank into which gas from the suction tank is drawn by suction, said tank including a main chamber, an inverted chamber, screws connected to the inverted chamber, and handwheels attached to the upper ends of said screws for manually raising and lowering the chamber, a purifier tank into which gas from the relief tank is delivered, and a storage tank into which gas from the purifier tank is delivered, and a plurality of conduits and valves operatively connecting the aforesaid tanks and retorts, substantially as set forth.

AUGUSTUS L. CLARK.